US011439129B2

United States Patent
McNaughton et al.

(10) Patent No.: US 11,439,129 B2
(45) Date of Patent: Sep. 13, 2022

(54) POULTRY FEEDER LIGHT AND LIGHT ASSEMBLY

(71) Applicant: AHPharma, Inc., Hebron, MD (US)

(72) Inventors: James L. McNaughton, Quantico, MD (US); Michael Barnas, Delmar, MD (US); Michael Roberts, Quantico, MD (US); Aaron Redden, Girdletree, MD (US)

(73) Assignee: AHPharma Inc., Hebron, MD (US)

(*) Notice: Subject to any disclaimer, the term of this patent is extended or adjusted under 35 U.S.C. 154(b) by 0 days.

(21) Appl. No.: 17/220,238

(22) Filed: Apr. 1, 2021

(65) Prior Publication Data

US 2021/0307298 A1 Oct. 7, 2021

Related U.S. Application Data

(60) Provisional application No. 63/003,510, filed on Apr. 1, 2020.

(51) Int. Cl.
| | | |
|---|---|---|
| *A01K 31/18* | (2006.01) | |
| *A01K 39/012* | (2006.01) | |
| *F21V 21/002* | (2006.01) | |
| *F21Y 113/13* | (2016.01) | |
| *F21Y 115/10* | (2016.01) | |

(52) U.S. Cl.
CPC .......... *A01K 31/18* (2013.01); *A01K 39/0125* (2013.01); *F21V 21/002* (2013.01); *F21Y 2113/13* (2016.08); *F21Y 2115/10* (2016.08)

(58) Field of Classification Search
CPC .... A01K 31/18; A01K 39/0125; F21V 21/02; F21V 21/0816; F21V 21/21088; F21V 21/088; F21Y 2113/13; F21Y 2115/10; F21Y 2107/30; F21S 2/00; F21W 2131/40

See application file for complete search history.

(56) References Cited

U.S. PATENT DOCUMENTS

| | | | | |
|---|---|---|---|---|
| 4,527,513 | A * | 7/1985 | Hart | A01K 39/04 119/51.5 |
| 8,657,463 | B2 * | 2/2014 | Lichten | A01K 31/18 362/217.05 |
| 9,907,294 | B2 * | 3/2018 | Otto-Luebker | A01K 39/01 |
| 2009/0078209 | A1 * | 3/2009 | Kroeker | A01K 5/01 119/51.01 |
| 2013/0016506 | A1 * | 1/2013 | Odom, Jr. | A01K 39/00 362/231 |

(Continued)

OTHER PUBLICATIONS

Blatchford, R. A. et al., "Contrast in Light Intensity, Rather Than Day Length, Influences the Behavior and Health of Broiler Chickens," Poultry Science 91(8), pp. 1768-1774.

(Continued)

*Primary Examiner* — Peggy A Neils
(74) *Attorney, Agent, or Firm* — Nixon & Vanderhye P.C.

(57) ABSTRACT

A lighting system for a poultry feeding house includes a wire harness attachable to an existing feeding house shocker wire or feed auger pipe and a lighting fixture positioned beneath the wire harness and positionable on the feed auger pipe. The lighting fixture includes dual-color LED components using two independently controlled channels. A wire connection secured to the wire harness encapsulates wire leads to power and control the lighting fixture.

18 Claims, 6 Drawing Sheets

(56) References Cited

U.S. PATENT DOCUMENTS

2016/0305622 A1* 10/2016 Baker, Jr. .............. F21V 33/006
2018/0252393 A1*  9/2018 Layne ................... F21V 21/002

OTHER PUBLICATIONS https://mobile.reuters.com/article/amp/idUSKBN1CW2IL, web site pages, printed out on Mar. 31, 2021, Oct. 27, 2017, 7 pp.
https://www.cspdailynews.com/amp.foodservice/mcdonalds-sets-new-animal-welfare-standards, web site pages, printed out on Mar. 31, 2021, Nov. 1, 2017, 6 pp.

* cited by examiner

POULTRY FEEDER LIGHT AND LIGHT ASSEMBLY

CROSS-REFERENCES TO RELATED APPLICATIONS

This application claims the benefit of U.S. Provisional Patent Application Ser. No. 63/003,510, filed Apr. 1, 2020, the entire content of which is herein incorporated by reference.

STATEMENT REGARDING FEDERALLY SPONSORED RESEARCH OR DEVELOPMENT (Not Applicable)

BACKGROUND

The invention relates to lighting systems for poultry houses and, more specifically, to an LED lighting system for poultry houses with two-channel LED fixtures for controlling light output, color and lighting characteristics.

A poultry house is used to raise chickens and turkeys for processing for the poultry industry. Traditionally, poultry houses utilize incandescent bulbs, compact fluorescent lamps (CFL) or LED bulbs to provide a day/night cycle for the birds. Incandescent bulbs, however, typically consume large amounts of electricity, and the color of light produced is not controllable or conducive to bird growth and feeding. CFLs commonly flicker when dimmed, negatively impacting animal welfare. Traditional LED bulbs in the ceiling are not bright enough to provide enough light intensity for maximum live-performance and animal welfare.

Lights are typically mounted on the ceilings of poultry houses. It has been discovered that birds are attracted to lights, and it is thus desirable to provide lights closer to the feeder pans. Existing systems, however, are not capable of illuminating a preset color cycle and may also be difficult to install in existing poultry house configurations.

SUMMARY

A lighting system of the described embodiments utilizes dual-color LED fixtures toggled using two independently controlled channels. The fixtures enable full control of light characteristics to optimize bird development. Additionally, the lighting system is readily installable using existing poultry house components.

In an exemplary embodiment, a lighting system is provided for a poultry feeding house with a feed line including a feed auger pipe, a plurality of feeder trays, and a shocker wire. The lighting system includes a wire harness attachable to the shocker wire or the feed auger pipe, where the wire harness encloses wires for powering the lighting system. A lighting fixture positioned beneath the wire harness and positionable on the feed auger pipe includes dual-color LED components using two independently controlled channels. A wire connection secured to the wire harness encapsulates wire leads to power and control the lighting fixture.

The lighting fixture may also include two rows of LED components. In some embodiments, the two rows of LED components may include a primary LED light resembling natural daylight (e.g., 4000-6500K, >90 CRI) and an optional secondary LED color such as green, blue, UV, etc. In some embodiments, the two rows may include a yellow light component and a green light component.

The system may include a plurality of lighting fixtures positionable along the feed auger pipe.

In some embodiments, the wire connection is a bracket as an overmolded section to protect the wires from corrosion or other environmental factors. The bracket may be T-shaped with a cross-member of the T-shape engaging the wire harness and a leg member of the T-shape securing a lead line to the lighting fixture.

In some embodiments, the wire connection may be a clamshell power connection with hinged halves. In this context, clamshell power connection may include an internal water-resistant liner adjacent an end where a lead line from the clamshell to the lighting fixture exits. The clamshell power connection may be configured to pierce a jack on the wires to make a connection to the lead line.

In some embodiments, the lighting fixture may include a casing engageable with the feed auger pipe. The casing may include curved portions that are engageable with and shaped corresponding to an outside diameter of the feed auger pipe. Straps may be securable around the feed auger pipe and over the curved sections of the casing.

In another exemplary embodiment, a lighting system for a poultry feeding house includes a wire harness attachable to the shocker wire or the feed auger pipe that encloses wires for powering the lighting system, a lighting fixture positioned beneath the wire harness and positionable on the feed auger pipe, and a wire connection secured to the wire harness. The lighting fixture includes dual-color LED components using two independently controlled channels, and the lighting fixture is positioned at poultry height or poultry eye level. The wire connection encapsulates wire leads to power and control the lighting fixture to protect the wire leads from detrimental effects of the poultry feeding house environment. A lead line extends from the wire connection to power the lighting fixture.

BRIEF DESCRIPTION OF THE DRAWINGS

These and other aspects and advantages will be described in detail with reference to the accompanying drawings, in which.

DETAILED DESCRIPTION

Figure 1A:
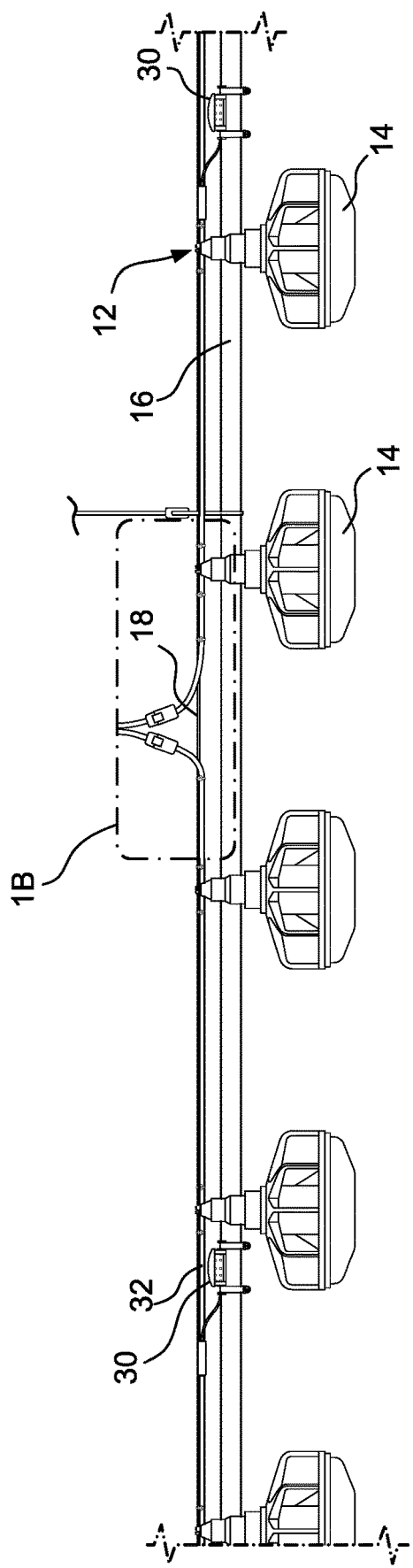
FIGS. 1A-1D show exemplary wiring feeding light lines utilizing the lighting system of the described embodiments.
Figure 1B:
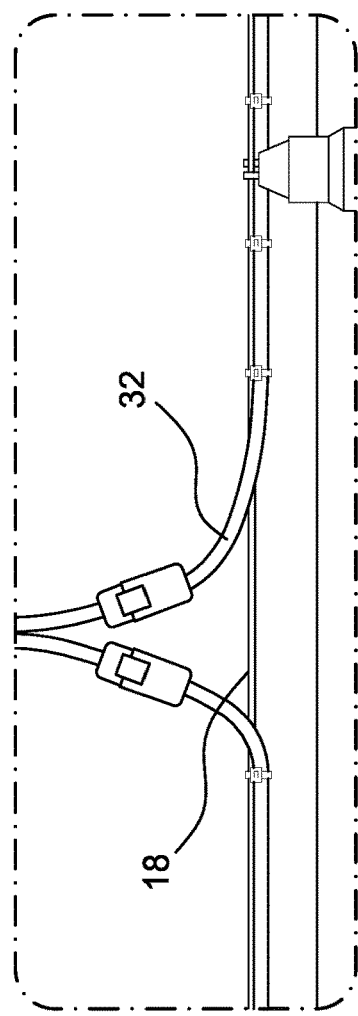
Figure 1C:
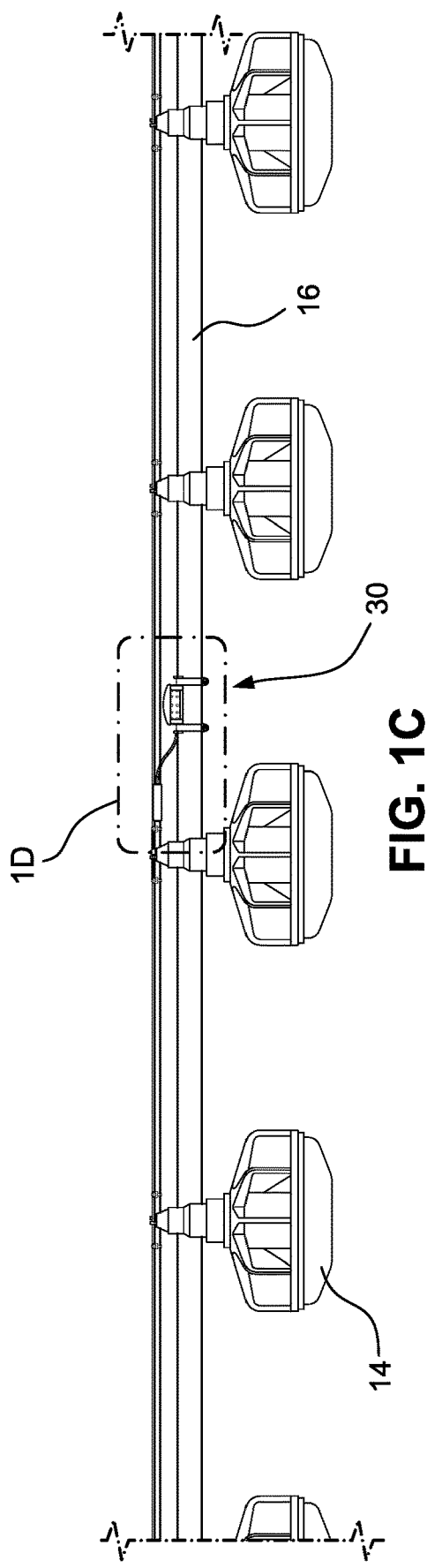
Figure 1D:
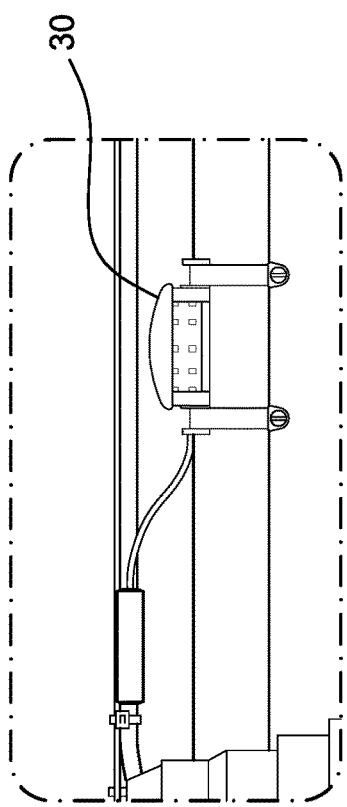

FIGS. 1A-1D show components of an exemplary feed line in a poultry house. The feed line generally extends along a length of the poultry house and includes a plurality of feed stations 12 spaced approximately two feet apart (e.g., for chickens). Each poultry house may include multiple feed lines.

The feed stations 12 include a feeder tray 14 positioned adjacent an opening in a feed auger pipe 16. Poultry feed is pushed through the feed auger pipe 16 by an auger within the pipe 16. Openings in the auger pipe 16 above each feeder tray 14 permit the poultry feed to drop down from the pipe 16 into each feeder tray 14.

A shocker wire 18 runs along the top of the feed auger pipe 16. Historically, the shocker wire 18 is intended to carry a current to keep birds off of the feed auger pipe 16, but the shocker wire in current poultry houses typically no longer carries a current. The shocker wire is now used to support the weight of the auger pipe among other things.

It is known that poultry are attracted to light, and illuminating their feeding and watering stations will assist in ensuring that poultry receive proper amounts of food and drink. Light fixtures 36 (discussed in more detail below) may be provided along the feeder line above or near the feeder stations 12 for this purpose.

Figure 2:
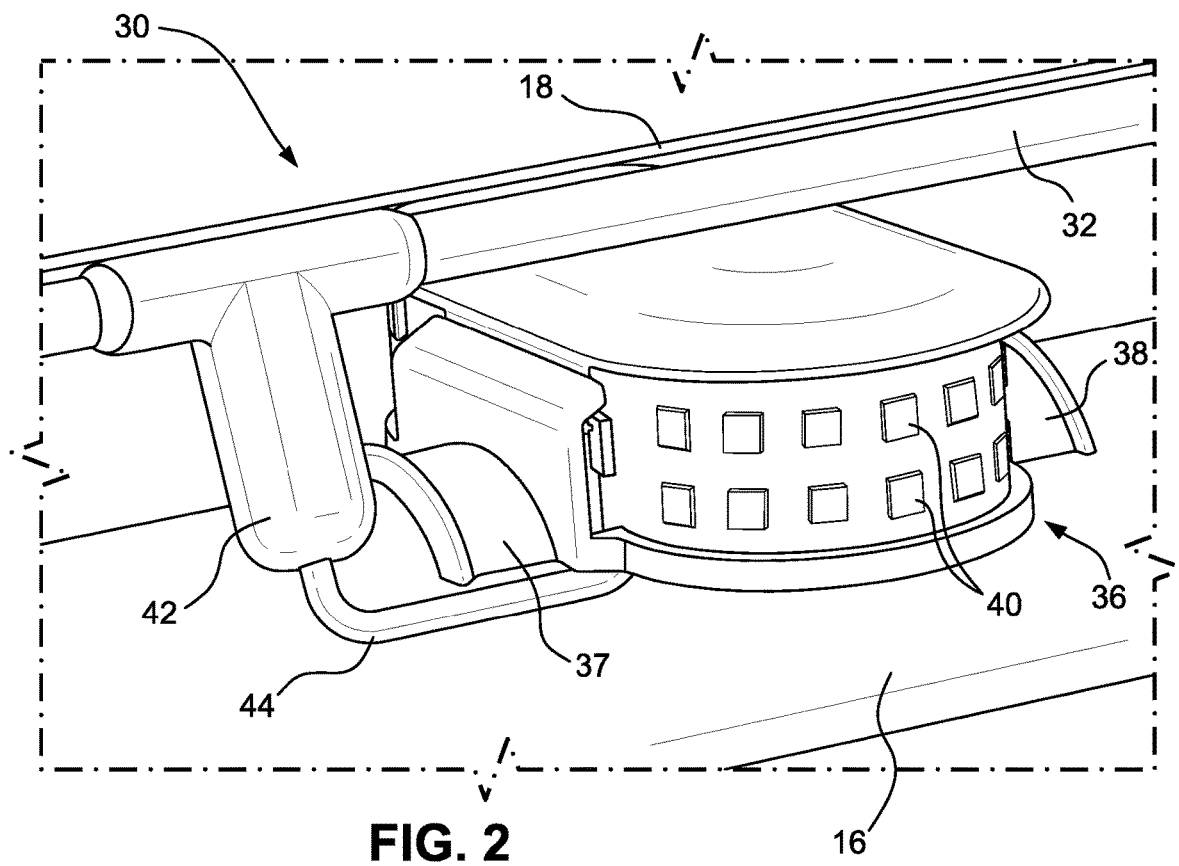
FIG. 2 shows an exemplary fixture in the lighting system of the described embodiments.
Figure 3:
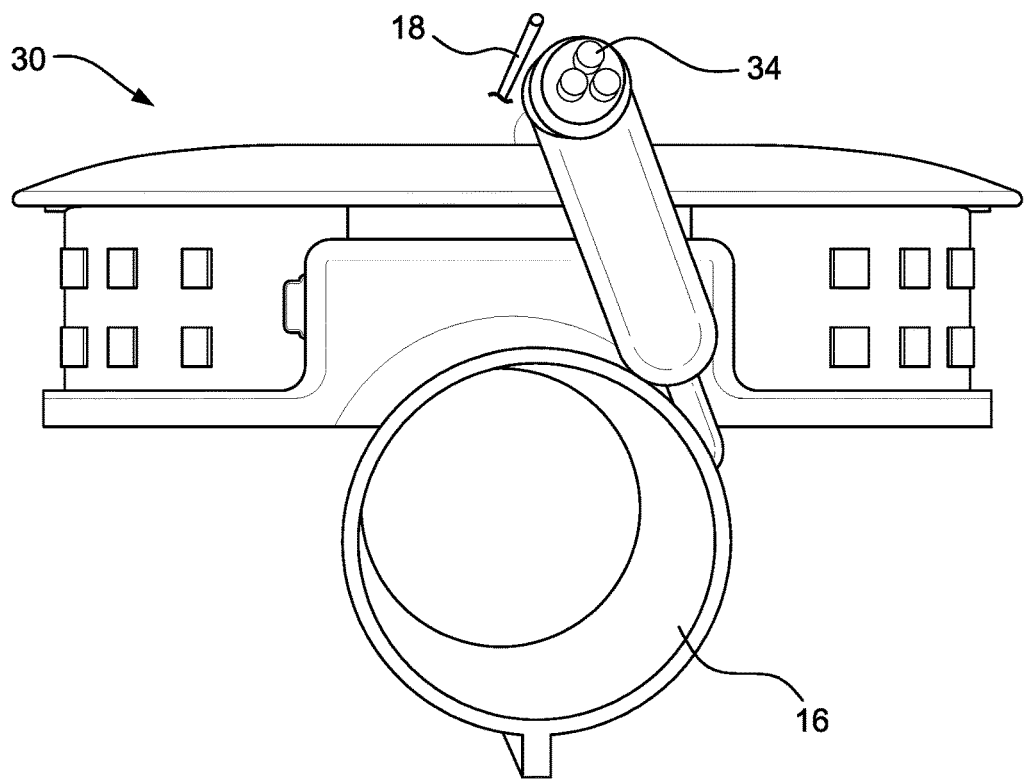
FIG. 3 is a sectional view through the feed auger pipe and a wire harness of the lighting system.
Figure 4:
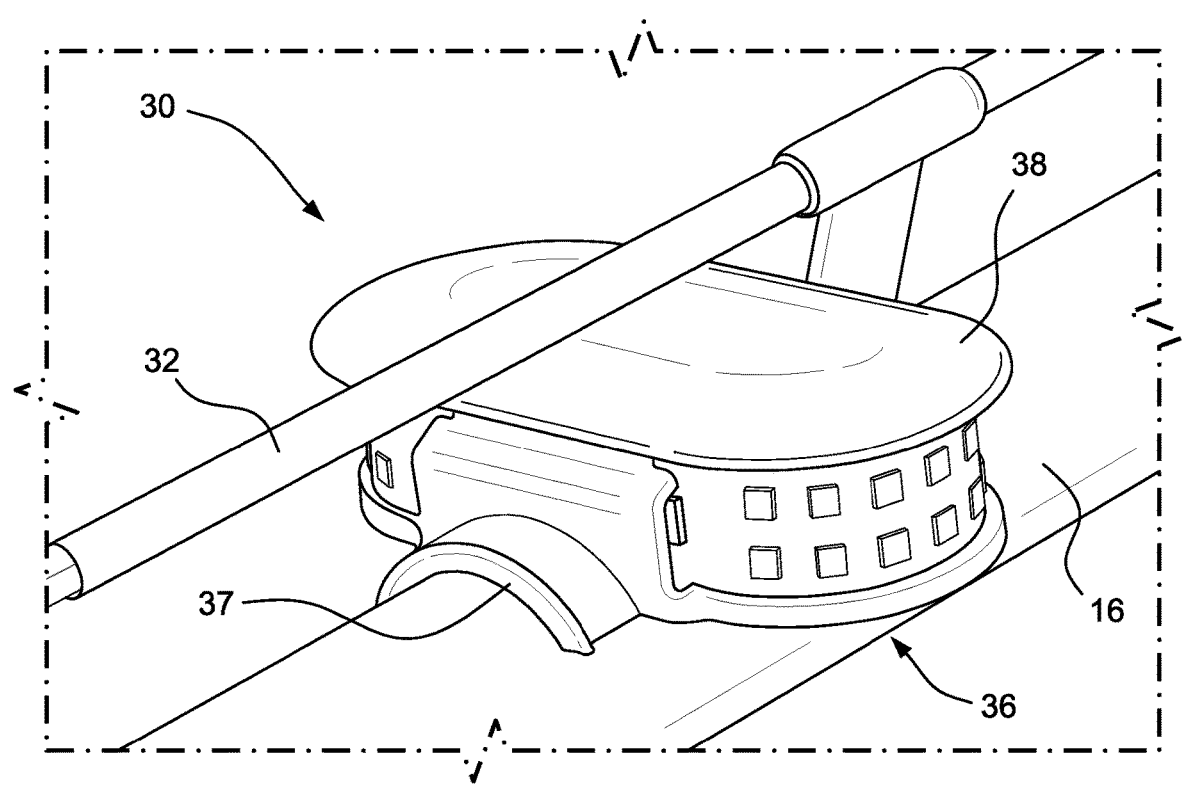
FIG. 4 is a perspective view of the lighting fixture from an opposite side of the feed auger pipe.

FIGS. 2-4 show an exemplary lighting system 30 of the described embodiments. The lighting system 30 is cooperable with existing poultry house structures including the shocker wire 18 and the feed auger pipe 16. A wire harness 32 is attachable to the shocker wire 18 or the feed auger pipe 16. In some embodiments, the wire harness 32 may be secured via zip ties 33 or the like to the shocker wire 18 (see FIG. 5). The wire harness 32 encloses wires 34 for powering and controlling the lighting system.

A lighting fixture 36 is positioned beneath the wire harness 32 and is positionable on the feed auger pipe 16. In this position, light emitted from the lighting fixture 36 is essentially at bird height, or bird eye level. In some embodiments, the lighting fixture 36 includes a casing 38 that is configured to securely engage the auger pipe 16 (e.g., see the curved portions 37 of the casing in FIGS. 2 and 4). The casing 38 thus facilitates installation of the lighting fixtures 36 on the feed auger pipe 16.

Each lighting fixture 36 includes dual-color LED components 40 using two independently controlled channels. With reference to FIGS. 2-4, in some embodiments, the dual-color LED components include two rows of LED components 40, for example including a yellow light component and a green light component.

A T-shaped bracket 42 encapsulates wire leads to power and control the lighting fixture 36. The bracket 42 is generally an overmolded section to protect the wires from corrosion or other environmental factors. As shown, a cross-member of the T-shape engages the wire harness 32 and a leg member of the T-shape secures a lead line 44 to the lighting fixture 36. That is, the lead line 44 extends from the bracket 42 to the lighting fixture 36. The bracket 42 and lead line 44 stabilize the lighting fixture 36 on the feed auger pipe 16.

Figure 5:
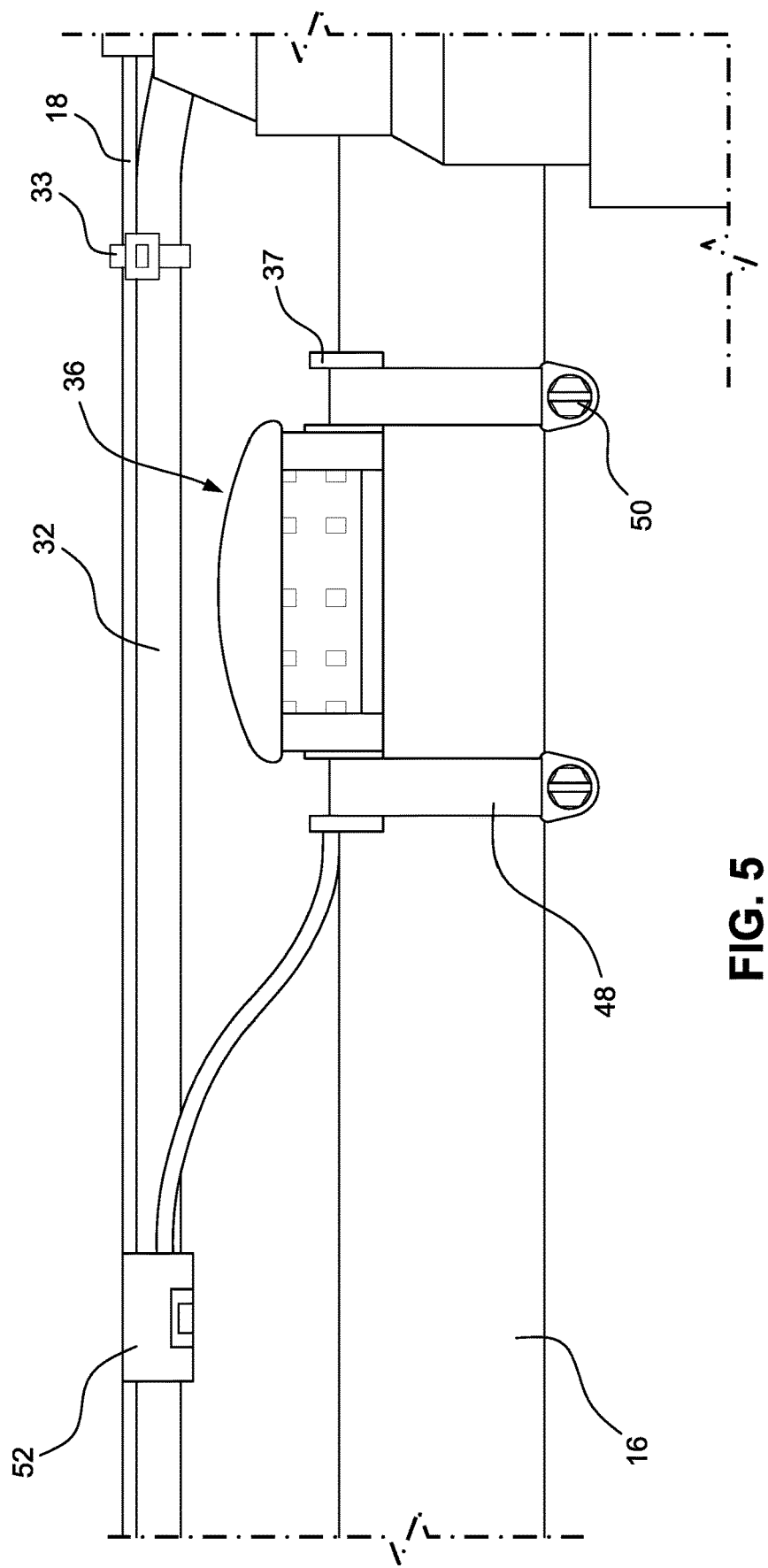
FIG. 5 shows a variation using straps to secure the fixture and an exemplary clamshell power configuration.

In some embodiments, with reference to FIG. 5, the curved portions 37 of the casing 38 may be secured to the feed auger pipe 16 with straps 48 or the like such as stainless straps. The straps 48 are fixed around the feed auger pipe 16 over the curved sections 37 of the casing 38 and are secured via a suitable connector 50.

Figure 6:
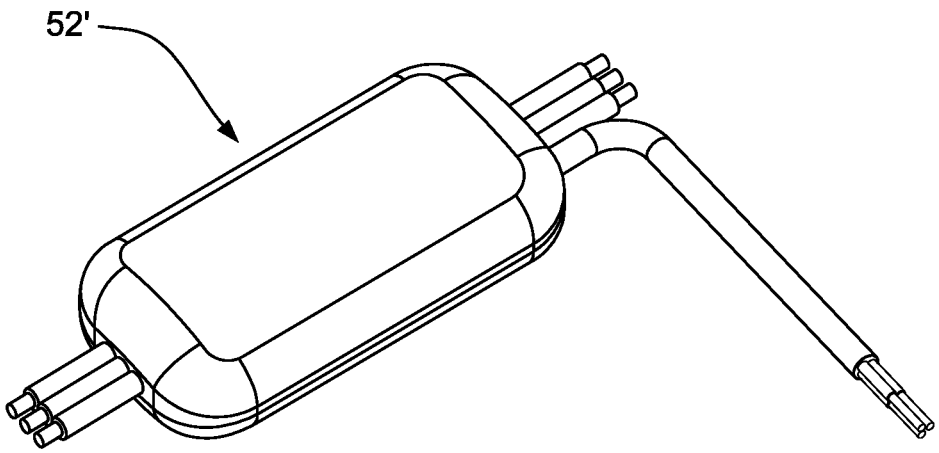
FIG. 6 shows an exemplary clamshell power configuration.

FIG. 5 also shows an alternative to the bracket 42 in the form of a clamshell power connection 52. The clamshell power connection 52 includes hinged halves with an internal water-resistant liner adjacent the end where the lead line 44 exits. The clamshell power connection 52 could be attached to the light and clip on the wire harness 32 anywhere down the line. The clamping/closing of the clamshell power connection 52 pierces the jack on the wiring and makes the connection to the lead line 44 leading to the light fixture 36. The drop length could be shortened to 8-12" since they can be placed anywhere. FIG. 6 shows an alternative clamshell power connection 52'.

By using dual color LED fixtures toggled using two independently controlled channels, light output can be controlled to optimize poultry experience. Primary LED light resembling natural daylight (5000K, >90 CRI) is employed in addition to an optional secondary LED color such as green, blue, UV, etc. Primary and secondary light sources may be used independently, or simultaneously to produce the desired light intensity, color and spectrum to optimize welfare. It has been discovered that optimal lighting conditions for poultry feeding should include a period of warm white in the morning at sunrise, cool white during midday, and fading into warm white before sunset. See, for example, Blatchford, R. A., G. S. Archer, and J. A. Mench, 2012-*Contrast in light intensity, rather than day length, influences the behavior and health of broiler chickens*. Poult Sci 91(8):1768-1774. doi: 10.3382/ps.2011-02051. The system could alternatively utilize UV and RGBA creating virtually infinite colors using the independently controlled channels.

The light patterns simulate the natural photo period under which jungle foul evolved into modern chickens. The dual-color LED components are independently controlled via a suitable house controller.

Figure 7:
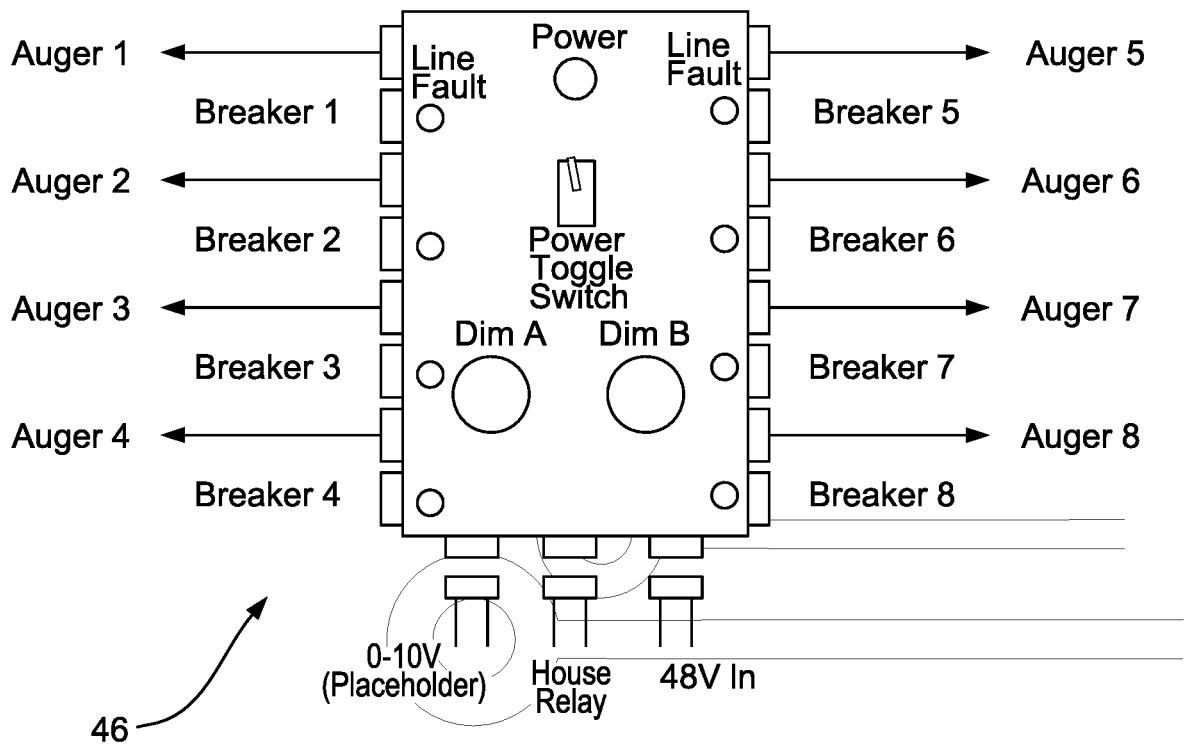
FIG. 7 is a schematic illustration of an exemplary controller.

FIG. 7 shows an exemplary controller 46. The controller 46 may include eight individual breakers used to supply power to the individual lines of feeder lights. Breakers are used to reset and quickly troubleshoot problems by identifying a defective line in the event of a fault. The controller 46 provides for independent manual dimming of both channels for each of the lighting fixture LED component rows. A common power wire terminates at the controller 46, which supplies 48V DC and a pulse-width modulation signal for dimming purposes. The controller includes functionality to interface with existing poultry house controllers which provide a 0-10V signal for sunrise/sunset of the LEDs and/or a relay function for automated scheduling of the light/dark cycle.

In use, a wiring harness may be about 32 feet long, with lighting fixtures positioned every eight feet along the feed auger pipe. We expect to encounter no more than 44 feeder lights on a single "breaker" or auger line, which amounts to 11 harnesses per continuous length of feed line maximum. This length limit is typically based on the weight of feed being carried through that standard auger. For example, a 400-600 ft house would typically break in the center with a hopper feeding into the augers either in the center or from each end. We also expect to have no more than 8 total auger lines per house, resulting in 8 (max) breakers/controller.

The continuous section of feed line is around 300 feet on average. Most poultry houses are 400-600 feet long with 2-3 feed lines running long ways down the house and breaking in several locations where feed bins empty into the auger. The system can be delivered to the customer with the wire harness and a plurality of the lighting fixtures. The wire harness is secured to the shocker wire via zip ties or the like, and the lighting fixtures can be readily placed on the feed auger pipe. Installation does not require an electrician and is readily assembled by attaching to existing poultry feeding house components.

It has been discovered that the birds prefer to eat in the light then digest and rest in the dark. The contrast or delta between light and dark areas should be significant to induce a natural behavioral response in the birds. By bringing the poultry house lighting closer to each of the feeder trays, the birds have more control over their environment, which provides for better poultry development. Additionally, research performed by the University of Arkansas has shown that lighting control can effect an increase in natural behavior such as "dust-bathing," which improves poultry welfare and development. See also requirements for bright light standards by 2024 for major fast food retailers: https://mobile.reuters.com/article/amp/idUSKBN1CW2IL and https://www.cspdailynews.com/amp/foodservice/mcdonalds-sets-new-animal-welfare-standards.

Poultry have a unique visible light spectrum, and studies have confirmed increased performance and welfare from incorporating blue, green and UV light into a rearing program. By emitting light only at bird-height in the areas where feed and water are present, birds raised using the system of the described embodiments will have greater animal welfare and freedom of expression than those raised under standard ceiling lights.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A lighting system for a poultry feeding house, the poultry feeding house including a feed line with a feed auger pipe, a plurality of feeder trays, and a shocker wire, the lighting system comprising:
a wire harness attachable to the shocker wire or the feed auger pipe, the wire harness enclosing wires for powering the lighting system;
a plurality of lighting fixtures positioned beneath the wire harness and positionable on and along the feed auger pipe, each of the lighting fixtures including dual-color LED components using two independently controlled channels; and
a wire connection secured to the wire harness, the wire connection encapsulating wire leads to power and control each of the lighting fixtures.

2. A lighting system according to claim 1, wherein each of the lighting fixtures comprises two rows of LED components.

3. A lighting system according to claim 2, wherein the two rows of LED components comprise a primary LED light resembling natural daylight and a secondary LED color.

4. A lighting system according to claim 2, wherein the two rows of LED components comprise a yellow light component and a green light component.

5. A lighting system according to claim 1, wherein the wire connection comprises a bracket as an overmolded section to protect the wires from corrosion or other environmental factors.

6. A lighting system according to claim 5, wherein the bracket is T-shaped with a cross-member of the T-shape engaging the wire harness and a leg member of the T-shape securing a lead line to the lighting fixture.

7. A lighting system according to claim 1, wherein the wire connection comprises clamshell power connection with hinged halves.

8. A lighting system according to claim 7, wherein the clamshell power connection comprises an internal water-resistant liner adjacent an end where a lead line from the clamshell to the lighting fixture exits.

9. A lighting system according to claim 8, wherein the clamshell power connection is configured to pierce a jack on the wires to make a connection to the lead line.

10. A lighting system according to claim 1, wherein each of the lighting fixtures comprises a casing engageable with the feed auger pipe and mounted independent of the feeder trays.

11. A lighting system according to claim 10, wherein the casing comprises curved portions that are engageable with and shaped corresponding to an outside diameter of the feed auger pipe.

12. A lighting system according to claim 11, further comprising straps securable around the feed auger pipe and over the curved sections of the casing.

13. A lighting system for a poultry feeding house, the poultry feeding house including a feed line with a feed auger pipe, a plurality of feeder trays, and a shocker wire, the lighting system comprising:
a wire harness attachable to the shocker wire or the feed auger pipe, the wire harness enclosing wires for powering the lighting system;
a plurality of lighting fixtures positioned beneath the wire harness and positionable on and along the feed auger pipe, each of the lighting fixtures including dual-color LED components using two independently controlled channels, wherein the lighting fixtures are positioned at poultry height or poultry eye level; and
a wire connection secured to the wire harness, the wire connection encapsulating wire leads to power and control each of the lighting fixtures to protect the wire leads from detrimental effects of the poultry feeding house environment, wherein a lead line extends from the wire connection to power each of the lighting fixtures.

14. A lighting system according to claim 13, wherein each of the lighting fixtures comprises two rows of LED components.

15. A lighting system according to claim 13, wherein the wire connection comprises clamshell power connection with hinged halves.

16. A lighting system according to claim 15, wherein the clamshell power connection comprises an internal water-resistant liner adjacent an end where the lead line from the clamshell to the lighting fixture exits.

17. A lighting system according to claim 16, wherein the clamshell power connection is configured to pierce a jack on the wires to make a connection to the lead line.

18. A lighting system according to claim 13, wherein each of the lighting fixtures comprises a casing engageable withe feed auger pipe and mounted independent of the feeder trays, the casing including curved portions that are engageable with and shaped corresponding to an outside diameter of the feed auger pipe.

* * * * *